Sept. 16, 1930.      F. A. KOWARICK, JR      1,776,075
LUBRICATING DEVICE FOR ENGINE PISTONS
Filed July 8, 1929
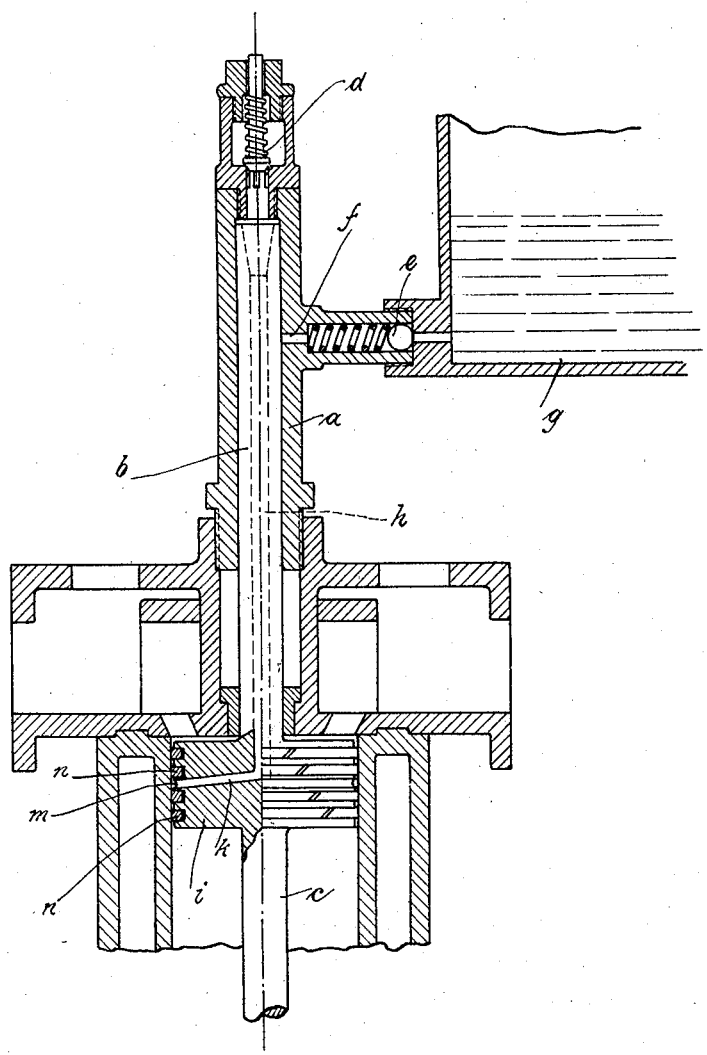

Patented Sept. 16, 1930

1,776,075

UNITED STATES PATENT OFFICE

FREDERICO ANTON KOWARICK, JR., OF SAO PAULO, BRAZIL

LUBRICATING DEVICE FOR ENGINE PISTONS

Application filed July 8, 1929, Serial No. 376,778, and in Germany October 29, 1928.

This invention relates to a piston lubricating device, particularly for high speed, high pressure steam engines, and is an improvement in or modification of that forming the subject of the prior application Ser. No. 331,262.

In the specification of the said prior application there is described a lubrication device in which the piston rod is prolonged above the piston and is formed with a bore extending into the piston and communicating with a peripheral groove in the piston located between two piston rings, the prolongation or extension of the piston rod functioning as a pump piston and projecting into a casing mounted on the engine cover and serving as a pump cylinder.

By means of the said device force feed lubrication of the piston and of the internal wall of the cylinder is ensured.

According to the present improvement or modification provision is made whereby the casing serving as a pump cylinder is replenished automatically, there being fitted to the pump cylinder an inwardly opening spring-loaded non-return valve controlling a connection to an oil reservoir, which valve opens under the influence of the pressure difference. Further, the pump cylinder is equipped with a loaded outwardly opening non-return valve which in the event of injury to the piston or failure of the rings permits outflow of steam, thereby warning the attendant.

In the accompanying drawing there is illustrated in vertical section a device according to the invention.

Mounted on the engine cylinder cover is a casing $a$ into which projects the extension $b$ of the piston rod $c$. The casing $a$ constitutes a pump cylinder and the piston rod extension $b$ a pump piston. At the outer end of the casing $a$ is fitted an outwardly opening spring-loaded non-return valve $d$. The oil supply passage $f$ serving to replenish the pump cylinder is formed in the side wall of the pump cylinder $a$ in front of the outer limit of the stroke of the piston rod extension $b$ and communicates with an oil reservoir $g$ between which and the passage $f$ is an inwardly opening non-return valve $e$. The piston rod extension $b$ has a bore $h$ which extends to about the middle of the piston $i$ and which is connected by passages $k$ with the peripheral groove $m$ in the piston, said groove being located between two piston rings $n$.

The mode of operation of the device is as follows:—

Before the engine is started the valve $d$ is first held open manually or otherwise and heated oil admitted until the bore $h$ of the piston-rod extension is about three-quarters full. Then the valve $d$ is closed. During the normal operation, on the ascent of the piston the air still confined in the casing $a$ is compressed whereby there is set up a slight pressure which is unable to overcome the stress of the spring loading the valve $d$ but which presses on the oil contained in the passage $k$ in the piston and in the annular groove $m$ so that the inner wall of the engine cylinder is coated with a thin film of oil on each stroke of the engine piston. In consequence of the continuous consumption of oil the level of oil in the bore falls and there is gradually set up in the pump cylinder $a$ on the descent of the piston a sub-normal pressure, below that in the oil reservoir $g$, so that the valve $e$ opens. There is thus effected automatic replenishment with oil from the reservoir $g$. Naturally, the oil in the reservoir $g$ need not be under atmospheric pressure but may be subject to higher pressure.

If in consequence of breakage of a piston ring or for any other cause there should be lack of tightness at the piston rings, so that steam forces the oil back through the passages $k$ and $h$, there is set up in the pump cylinder $a$ an excess pressure which overcomes the power of the spring loading the valve $d$ whereby the valve is opened. Steam now escapes so that the attendant is apprised that he must shut down the engine. Also in case excess pressure should be set up in the pump cylinder $a$ for any other cause, the valve $d$ acts as a safety valve.

I claim:—

In combination with an engine cylinder, a cover for the cylinder, a piston reciprocating in said cylinder, said piston formed with an annular peripheral groove and with an internal passage leading to said groove, a casing mounted on said cover, a piston rod extension extending from said piston through said cover into said casing, said piston rod extension formed with a bore in communication with said passage and thereby with said groove, an oil reservoir, a connection between said reservoir and said casing, a spring-loaded non-return valve fitted to said connection and adapted to open in the direction towards said casing, said valve opening automatically under the influence of a pressure difference between said reservoir and said casing, and a non-return valve at the upper end of said casing, said second mentioned valve adapted to open outwardly when abnormal pressure is set up in said casing.

In testimony whereof I have signed my name to this specification.

FREDERICO ANTON KOWARICK, Junior.